Oct. 12, 1926. 1,602,782
A. C. RIPPY ET AL
LISTER FURROW CLEANER
Filed Oct. 9, 1925
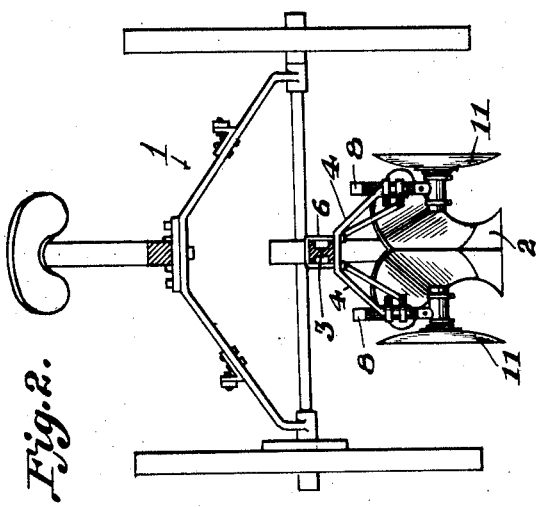
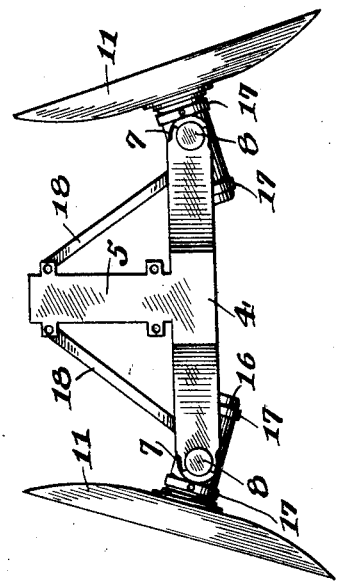
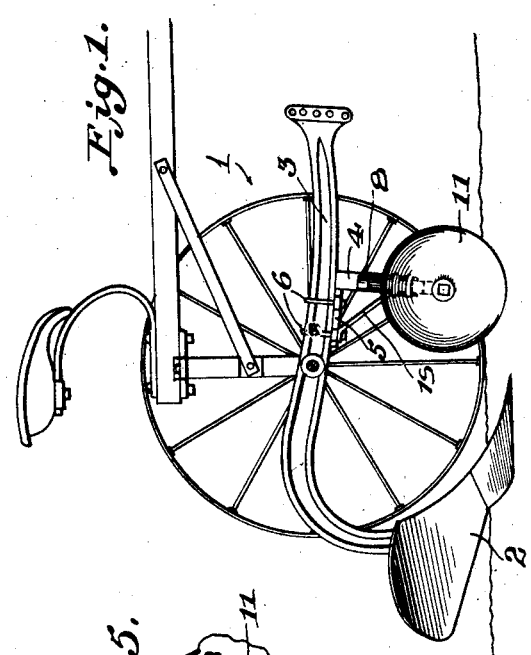
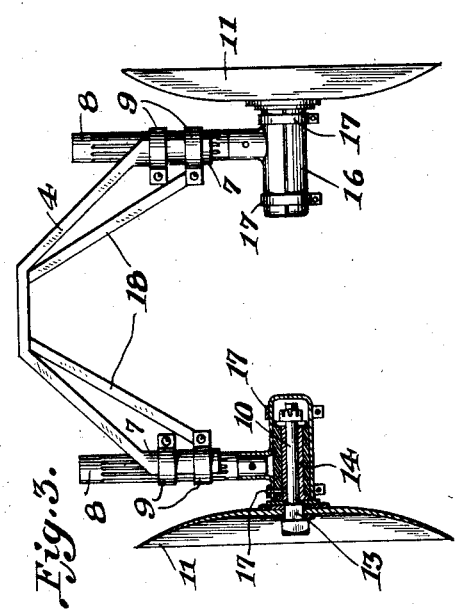
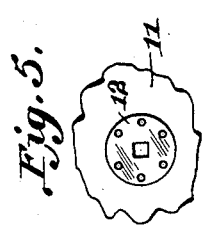
Inventor
A. C. Rippy
Noah Meadows
By Eccleston & Eccleston
Attorneys Patented Oct. 12, 1926.

1,602,782

UNITED STATES PATENT OFFICE.

AUCTIV C. RIPPY AND NOAH MEADOWS, OF AMARILLO, TEXAS.

LISTER-FURROW CLEANER.

Application filed October 9, 1925. Serial No. 61,574.

This invention relates to agricultural implements of the lister type and has for its object to provide an attachment for the conventional style of lister which will greatly improve its operation.

In the use of the ordinary lister the plow throws back the dirt to each side of the furrow leaving an uncut wall of dirt on each side, and these walls are lightly covered with the fresh soil thrown back. Vegetation therefore, starts at once and reaches a rank growth before the plants in the bottom of the furrow have reached a substantial growth. It is therefore an object of the present invention to supplement the operation of the ordinary lister by the addition of means placed ahead of and to each side of the plow which will function to eliminate these walls by throwing back the soil ordinarily untouched by the lister plow at these points; thus producing a furrow the walls of which are perfectly clean and free from vegetation, thereby obviating the use of a cultivator or go-devil before the plants break through the surface of the soil.

A further object of the invention resides in the provision of novel means by which the attachment may be readily adjusted to vary the size and contour of the furrow.

Other objects and advantages of the invention will be apparent from the following description when taken in connection with the accompanying drawings, in which:

Figure 1 is a side elevation of a portion of a conventional lister showing our attachment in position.

Figure 2 is an end elevation partly in section of the lister and attachment.

Figure 3 is an end elevation, partly in section, of the attachment per se.

Figure 4 is a plan of the attachment.

Figure 5 is a fragmentary view of one of the discs and reinforcing plate, and;

Figure 6 shows an end and side view of a wooden jacket for a bushing.

Referring to the drawings in detail the numeral 1 indicates generally a lister, a number of the elements of which have been omitted for the sake of clearness. The plow of the lister is designated by the numeral 2, while the numeral 3 indicates the beam. It will be understood of course, that the attachment about to be described may be used on either a single or double row lister although only the former type is disclosed on the drawings.

The means for attaching the additional cutting units to the lister consists of a substantially V-shaped bracket 4 provided with a horizontal extension 5 which may be secured to the under surface of the beam 3 by means of the U-bolts 6. Each of the arms of the V-shaped bracket 4 terminates in a substantially semi-cylindrical sleeve 7 provided with longitudinal corrugations adapted for cooperation with the longitudinally corrugated stems 8 which are mounted within the sleeves and firmly clamped thereto by means of the clamping rings 9.

Attached to the lower end of each stem 8 is a bearing for the shaft 10 of the cutting disc 11. These discs are each provided with a central plate 12 riveted thereto and formed with a rectangular opening registering with a similar opening in the disc 11 and receiving the squared end 13 formed on one end of the shaft 10. Each shaft 10 is mounted in a bushing 14 which is fixedly secured in a split cylinder 15 formed of wood or the like, which is in turn secured in the cylindrical casing 16 by means of the clamping rings 17. For the purpose of attaching the casing 16 to the stem 8 the upper half of the former is provided with a vertically-extending sleeve in which the lower end of the stem 8 is seated and secured.

The attachment may be suitably braced by means of rods 18 which are preferably secured to the rear U-bolt 6 and to the lower bands 9 which clamp the semi-cylindrical sleeves 7 to the stems 8.

In operation it will be apparent that the discs 11, being forward of and to each side of the lister point, will remove the wall of earth ordinarily left untouched by the lister, thereby preventing the early growth of vegetation on these walls which has heretofore been possible. It will also be apparent that by loosening the clamping bands 9—9 the discs 11 may be raised or lowered so as to cut at the proper depth, or adjusted angularly so as to vary the lateral distance from the lister point at which the disc cuts the soil.

In accordance with the patent statutes we have described what we now believe to be the best embodiment of the invention, but we do not wish to be understood thereby as limiting ourselves or the scope of the invention, as many changes and modifications may be made without departing from the spirit of the invention; all such we aim to include in the scope of the appended claims.

What we claim as new and desire to secure by Letters Patent is:

1. The combination with a lister including a plow and beam, a substantially U-shaped bracket secured to said beam, each arm of said bracket terminating in a sleeve, stems mounted in said sleeves for vertical adjustment, horizontally extending bearings carried by the lower ends of said stems, cutting discs mounted in said bearings, and brace rods having their respective ends secured to said sleeves and to said beam.

2. In combination with a lister including a plow and beam, a bracket secured to said beam, arms on said bracket, substantially semi-cylindrical corrugated sleeves carried by said arms, longitudinally corrugated stems mounted in said sleeves, means for clamping said stems to said sleeves, bearings carried by the lower ends of said stems, and cutting discs revolvably mounted in said bearings.

AUCTIV C. RIPPY.
NOAH MEADOWS.